US012418635B2

(12) United States Patent
Tenkasi Shankar et al.

(10) Patent No.: US 12,418,635 B2
(45) Date of Patent: Sep. 16, 2025

(54) MOTION-BASED FRAME SYNCHRONIZATION

(71) Applicant: ZEBRA TECHNOLOGIES CORPORATION, Lincolnshire, IL (US)

(72) Inventors: Raghavendra Tenkasi Shankar, Holbrook, NY (US); Ted D. Trask, Cary, NC (US)

(73) Assignee: Zebra Technologies Corporation, Lincolnshire, IL (US)

( * ) Notice: Subject to any disclaimer, the term of this patent is extended or adjusted under 35 U.S.C. 154(b) by 106 days.

(21) Appl. No.: 18/529,870

(22) Filed: Dec. 5, 2023

(65) Prior Publication Data

US 2025/0184462 A1    Jun. 5, 2025

(51) Int. Cl.
*H04N 13/167* (2018.01)
*G06F 3/0346* (2013.01)
*H04N 13/207* (2018.01)
*H04N 13/25* (2018.01)
*H04N 13/296* (2018.01)

(52) U.S. Cl.
CPC ......... *H04N 13/167* (2018.05); *G06F 3/0346* (2013.01); *H04N 13/207* (2018.05); *H04N 13/25* (2018.05); *H04N 13/296* (2018.05)

(58) Field of Classification Search
CPC .... H04N 13/167; H04N 13/207; H04N 13/25; H04N 13/296; G06F 3/0346

USPC ......................................................... 348/46
See application file for complete search history.

(56) References Cited

U.S. PATENT DOCUMENTS

| | | | |
|---|---|---|---|
| 10,510,155 B1* | 12/2019 | Islam | G06T 7/70 |
| 11,704,841 B2* | 7/2023 | Mashita | G06N 3/08 |
| 11,792,505 B2* | 10/2023 | Feng | H04N 23/80 |
| | | | 348/222.1 |
| 2013/0010079 A1* | 1/2013 | Zhang | H04N 13/20 |
| | | | 348/47 |
| 2019/0188880 A1* | 6/2019 | Hattori | B25J 9/1697 |
| 2020/0057778 A1* | 2/2020 | Sun | G06N 3/04 |
| 2020/0285831 A1 | 9/2020 | Slatcher et al. | |
| 2022/0301192 A1 | 9/2022 | Boardman et al. | |

OTHER PUBLICATIONS

International Search Report and Written Opinion for International Patent Application No. PCT/US2024/057414 mailed on Jan. 27, 2025.

* cited by examiner

*Primary Examiner* — Tung T Vo (57) ABSTRACT

A method includes: capturing, via a first sensor, a three-dimensional image associated with a first orientation of a computing device; capturing, via a second sensor, a two-dimensional image associated with a second orientation of the computing device; determining a difference between the first orientation and the second orientation; comparing the difference with a threshold; and determining whether to deliver the three-dimensional image and the two-dimensional image to an image-processing module, based on the comparison of the difference with the threshold.

16 Claims, 5 Drawing Sheets

MOTION-BASED FRAME SYNCHRONIZATION

BACKGROUND

Certain mobile devices, such as portable computers, may include multiple image sensors, e.g., a sensor for three-dimensional image capture and a sensor for two-dimensional image capture. Images from such sensors can be employed together to detect and/or dimension objects in the images, for example. A lack of synchronization between the capture of the three-dimensional image and the two-dimensional image may reduce the accuracy of processes such as dimensioning.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, comprising: capturing, via a first sensor, a three-dimensional image associated with a first orientation of a computing device; capturing, via a second sensor, a two-dimensional image associated with a second orientation of the computing device; determining a difference between the first orientation and the second orientation; comparing the difference with a threshold; and determining whether to deliver the three-dimensional image and the two-dimensional image to an image-processing module, based on the comparison of the difference with the threshold.

Additional examples disclosed herein are directed to a computing device, comprising: a first sensor; a second sensor; and a processor configured to: capture, via the first sensor, a three-dimensional image associated with a first orientation; capture, via the second sensor, a two-dimensional image associated with a second orientation; determine a difference between the first orientation and the second orientation; comparing the difference with a threshold; and determine whether to deliver the three-dimensional image and the two-dimensional image to an image-processing module, based on the comparison of the difference with the threshold.

Figure 1:
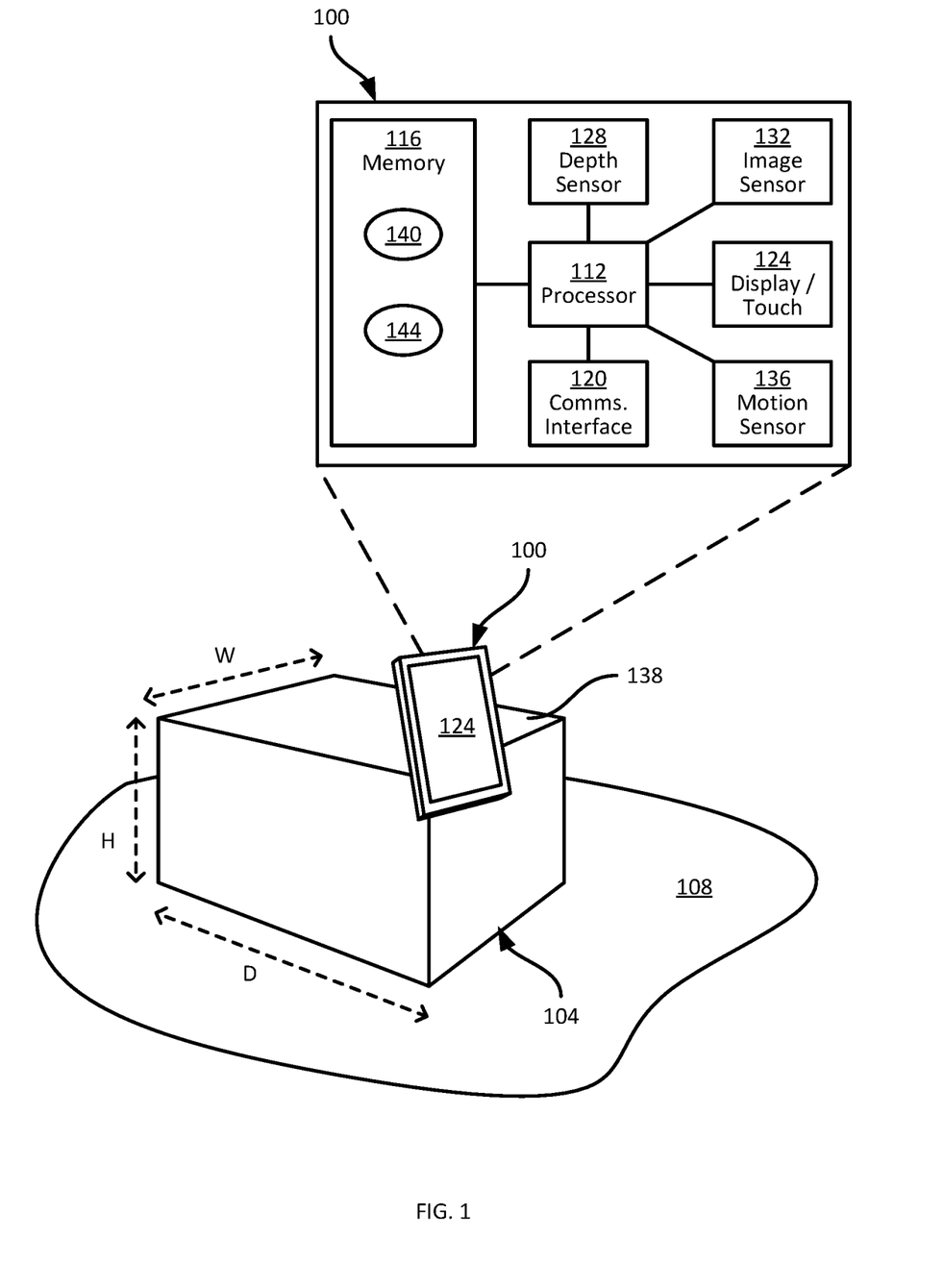
FIG. 1 is a diagram of a computing device for capturing 2D and 3D images.

FIG. 1 illustrates a computing device 100 configured to capture and process sensor data from distinct sensors, such as an image sensor and a depth sensor. The computing device 100, in the illustrated example, is a mobile computing device such as a tablet computer, smartphone, or the like. The device 100 can be configured to process captured data from both sensors in concert for a variety of post-processing functions, such as the detection and/or dimensioning of an object 104 disposed on a support surface 108. For example, the device 100 can be manipulated by an operator thereof to place the object 104 within the fields of view (FOVs) of the sensors, to capture sensor data for subsequent processing.

The object 104, in this example, is a parcel (e.g., a cardboard box, pallet, or the like), although a wide variety of other objects can also be processed as discussed herein, including irregularly-shaped objects, collections of objects rather than single objects, and the like. The device 100 (or in some examples, another computing device such as a server, configured to obtain the sensor data from the device 100) can be configured to determine dimensions from the sensor data captured by the device 100, such as a width "W", a depth "D", and a height "H" of the object 104. Dimensions determined from the sensor data can be employed in a wide variety of downstream processes, such as optimizing loading arrangements for storage containers, pricing for transportation services based on parcel size, and the like. Various other data processing operations can also use the sensor data, in addition to or instead of dimensioning as mentioned above, such as object tracking algorithms and the like.

Certain internal components of the device 100 are also shown in FIG. 1. For example, the device 100 includes a processor 112 (e.g., a central processing unit (CPU), graphics processing unit (GPU), and/or other suitable control circuitry, microcontroller, or the like). The processor 112 is interconnected with a non-transitory computer readable storage medium, such as a memory 116. The memory 116 includes a combination of volatile memory (e.g. Random Access Memory or RAM) and non-volatile memory (e.g. read only memory or ROM, Electrically Erasable Programmable Read Only Memory or EEPROM, flash memory). The memory 116 can store computer-readable instructions, execution of which by the processor 112 configures the processor 112 to perform various functions in conjunction with certain other components of the device 100. The device 100 can also include a communications interface 120 enabling the device 100 to exchange data with other computing devices, e.g., via local and/or wide area networks, short-range communications links, and the like.

The device 100 can also include one or more input and output devices, such as a display 124, e.g., with an integrated touch screen. In other examples, the input/output devices can include any suitable combination of microphones, speakers, keypads, data capture triggers, or the like.

The device 100 further includes a depth sensor 128, controllable by the processor 112 to capture three-dimensional (3D) images. Each frame captured via the sensor 128 can include, for example, a plurality of depth measurements corresponding to pixels of the sensor 128. The processor 112, or a dedicated controller of the sensor 128, can generate a point cloud from the frame, e.g., based on calibration parameters for the depth sensor 128. The point cloud can include a plurality of points, each defined by coordinates in a three-dimensional coordinate system. The depth sensor 128 can include a time-of-flight (ToF) sensor, a stereo camera assembly, a LiDAR sensor, or the like. The depth sensor 128 can be mounted on a housing of the device 100, for example on a back of the housing (opposite the display 124, as shown in FIG. 1) and having an optical axis that is substantially perpendicular to the display 124.

The device 100 also includes an image sensor 132. The image sensor 132 can include a complementary metal-oxide semiconductor (CMOS) or charge-coupled device (CCD) camera, and can be controlled to capture two-dimensional (2D) images. Each frame captured via the sensor 132 can include, for example, a plurality of color and/or intensity values for each pixel of the sensor 132. The FOV of the sensor 132 can overlap at least in part with the FOV of the sensor 128. In some examples, the sensor 132 has a larger FOV than the sensor 128, such that the FOV of the sensor 132 encompasses and extends beyond the FOV of the sensor 128. In some examples, the 2D images captured by the sensor 132 may also have a higher resolution (e.g., a larger number of pixels) than the 3D images captured by the sensor 128.

The device 100 further includes a motion sensor 136, such as an inertial measurement unit (IMU) including one or more accelerometers and/or gyroscopes. The motion sensor 136 can be configured to produce a sequence of orientation and/or pose (e.g., position and orientation) measurements indicating the current orientation and/or position of the device. For example, the motion sensor 136 can track an orientation of the device as a set of angles about three axes of rotation (e.g., pitch, yaw, and roll). In some examples, the motion sensor 136 can also track a position (e.g., in a three-dimensional coordinate system) of the device 100, e.g., in conjunction with processing of images from the sensor 132 to implement a simultaneous localization and mapping (SLAM) process, or the like.

Image processing functions such as dimensioning can include, for example, detecting the object 104 within a captured image, e.g., by detecting the support surface 108 and an upper surface 138 of the object 104. The height H of the object 104 can be determined as the perpendicular distance between the upper surface 138 and the support surface 108. The width W and the depth D can be determined as the dimensions of the upper surface 138. As will be understood by those skilled in the art, the above dimensions can be determined from 3D images captured by the sensor 128.

The speed and/or accuracy with which the device 100 segments the object 104 within 3D images can be improved by also processing 2D images from the sensor 132. For example, 2D images can be processed via various object-detection algorithms (e.g., You Only Look Once or other neural network-based detection algorithms, and/or suitable combinations of edge-detection operations and the like) to detect a region of interest containing the object 104 (e.g., a bounding box) within a 2D image. Using calibration data that defines the physical positions of the sensors 128 and 132 relative to one another, the device 100 can determine the position of the region of interest within the 3D image, thus potentially locating the object 104 in the point cloud more quickly than if segmenting based on the point cloud alone.

The above combined processing of 3D and 2D image data relies on synchronization of frame capture at the sensors 128 and 132. For example, if sufficient time has elapsed between the capture of a 2D image by the sensor 132 and the capture of a 3D image by the sensor 128, a position and/or orientation of the device 100 may have changed between the two frame capture operations, such that the position of the object 104 within the sensor FOVs is inconsistent between frames. Under such conditions, a region of interest determined from the 2D image may not correspond accurately to the position of the object 104 in the 3D image. The sensors 128 and 132 may capture images at different frame rates (e.g., about 10 frames per second for the sensor 128 and about 40 frames per second for the sensor 132, although a wide variety of other frame rates are also contemplated).

Synchronizing frame capture between 2D and 3D sensors in other devices can be implemented by providing a hardware-based communications link between the sensors, such as one or more general purpose input/output (GPIO) lines. The GPIO line(s) can be employed to apply a common capture signal to the sensors, or to relay a capture signal (e.g., received from a processor) from one sensor to another. However, implementing a hardware link as set out above may increase the cost and complexity of the device.

In other devices, synchronizing frame capture can be implemented by comparing timestamps associated with the 2D and 3D images, e.g., to determine whether the timestamps are sufficiently close to another. The sensors 128 and 132, however, may have different start-up times (e.g., the time between receiving an instruction to begin capture and actually capturing a first frame), and may also take different amounts of time to produce images after a capture operation. For example, the processing of a captured frame at the sensor 128 to produce a point cloud, depth map, or the like, may be more time-consuming than the processing of a captured frame at the sensor 132. The timestamps associated with captured frames may therefore not align exactly with the time at which light impacted the corresponding sensor.

The device 100 implements certain functions, discussed below, to more accurately assess the synchronization of captured 2D and 3D images, and to control whether a given pair of a 2D image and a 3D image is used in downstream processing based on the assessment.

The memory 116 stores computer readable instructions for execution by the processor 112. In particular, the memory 116 stores a pre-processing application 140 that, when executed by the processor 112, configures the processor 112 to process pairs of 2D and 3D images (e.g., each pair consisting of a 2D image from the sensor 132 and a 3D image from the sensor 128) to determine whether the images are sufficiently synchronized for use in combined processing operations such as the segmentation functionality discussed above.

The memory 116 also stores, in this example, an image-processing application 144 (also referred to as an image-processing module) that, when executed by the processor 112, configures the processor 112 to process a pair of a 3D image and a 2D image, e.g., to segment and dimension the object 104. In some examples, the application 144 can therefore also be referred to as a dimensioning module. In other examples, the application 144 can be implemented by a separate device from the device 100, e.g., in communication with the device 100 via the interface 120.

The applications 140 and 144 are illustrated as distinct applications for illustrative purposes, but in other examples, the functionality of the applications 140 and 144 may be integrated in a single application. In further examples, either or both of the applications 140 and 144 can be implemented by one or more specially designed hardware and firmware components, such as FPGAs, ASICs and the like.

Figure 2:
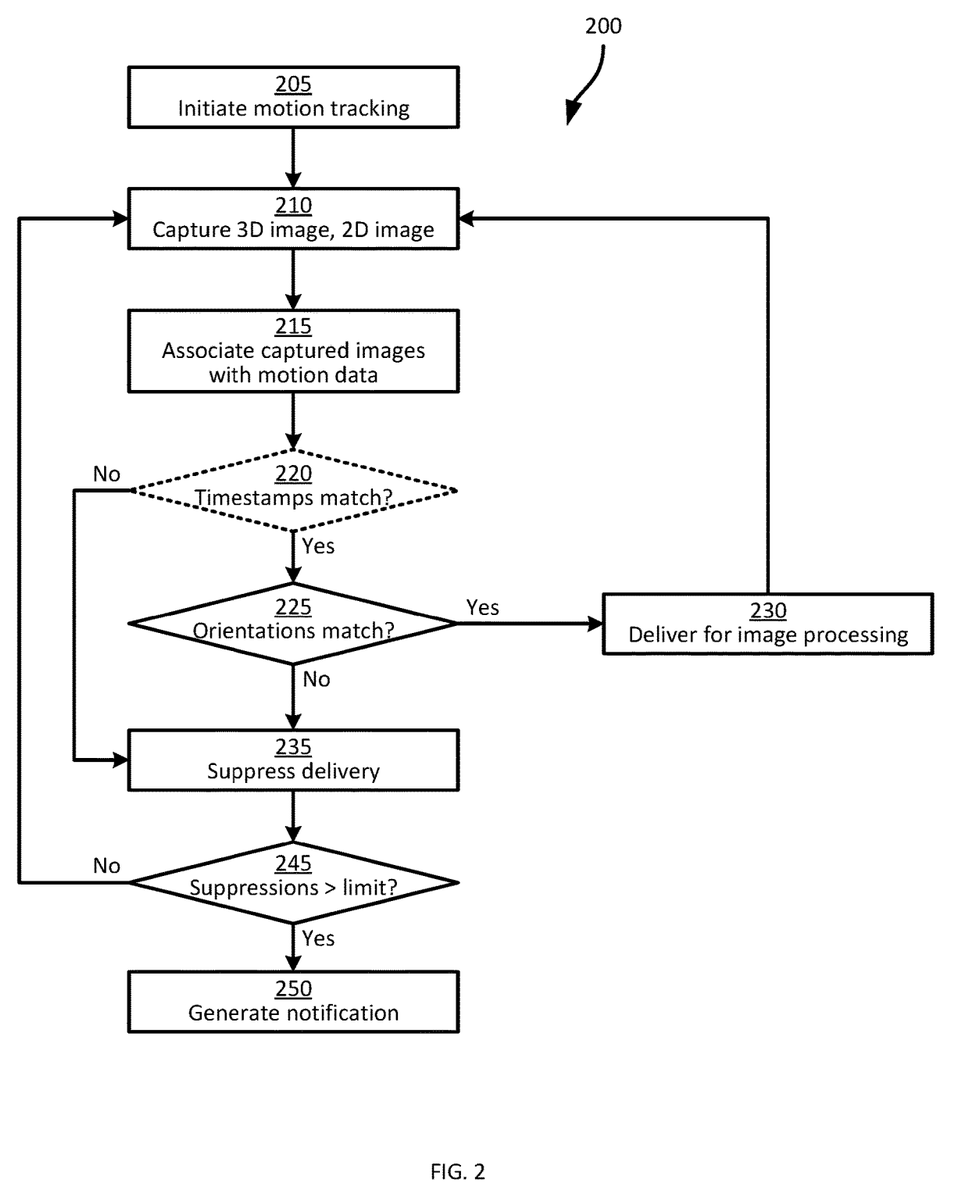
FIG. 2 is a flowchart of a method of motion-based frame synchronization in the device of FIG. 1.

Turning to FIG. 2, a method 200 of motion-based frame synchronization is illustrated. The method 200 is described below in conjunction with its performance by the device 100, e.g., to capture 2D and 3D images for dimensioning the object 104. It will be understood from the discussion below that the method 200 can also be performed by a wide variety of other computing devices, and that the captured images can be employed for purposes other than dimensioning.

At block 205, the processor 112 can be configured to initiate motion tracking of the device 100, via the motion sensor 136. For example, the processor 112 can control the motion sensor 136 to begin capturing a sequence of orientations of the device 100. The frequency with which the motion sensor captures successive orientations can vary according to the capabilities of the sensor 136. In some examples, the sensor 136 generates orientations at a rate equal to or greater than the frame rate of the sensor 132, which in turn captures images at a greater rate than the sensor 128. In some examples, as noted earlier, the processor 112 can employ data from the motion sensor 136 and/or other sensors, including the sensors 128 and 132, to also generate positional data, such that a sequence of poses is generated. The capture of motion data, in the form of orientations or poses, as initiated at block 205, can continue throughout the performance of the method 200.

At block 210, the device 100 is configured to capture a 3D image via the sensor 128, and a 2D image via the sensor 132. The capture operations at block 210 can be initiated by, for example, sending a command from the processor 112 to each of the sensors 128 and 132. In some examples, the command results in a single frame capture at each of the sensors 128 and 132. In other examples, the command initiates sequential frame capture at each of the sensors 128 and 132, e.g., such that the sensors 128 and 132 operate in a video mode (albeit at different frame rates in some examples).

The images captured at block 210 can be associated with timestamps, e.g., based on the time the images are received at the processor 112 from the sensors 128 and 132. In other examples, the sensors 128 and/or 132 can associate the images with timestamps based on a system time maintained by the processor 112 prior to providing the images to the processor 112. At block 215, the processor 112 is configured to associate the captured 2D and 3D images with motion data from the motion sensor 136. For example, the processor 112 can be configured, when a frame from the sensor 128 is received, to associate the most recently-received sample of motion data from the sensor 136 with that frame. The processor 112 can also be configured to associate the most recently-received sample of motion data from the sensor 136 with a frame from the sensor 132 upon receipt of the frame.

When the image capture process initiated at block 210 is sequential, e.g., in that each sensor 128 and 132 begins capturing a sequence of images, the processor 112 can be configured to perform the assessment and data handling operations discussed below for each pair of images. For example, the processor 112 can maintain in working memory the most recent 2D image and the most recent 3D image, and can repeat the below assessments each time one or both of the most recent 2D image and the most recent 3D image is updated (e.g., forming a new pair).

Figure 3:
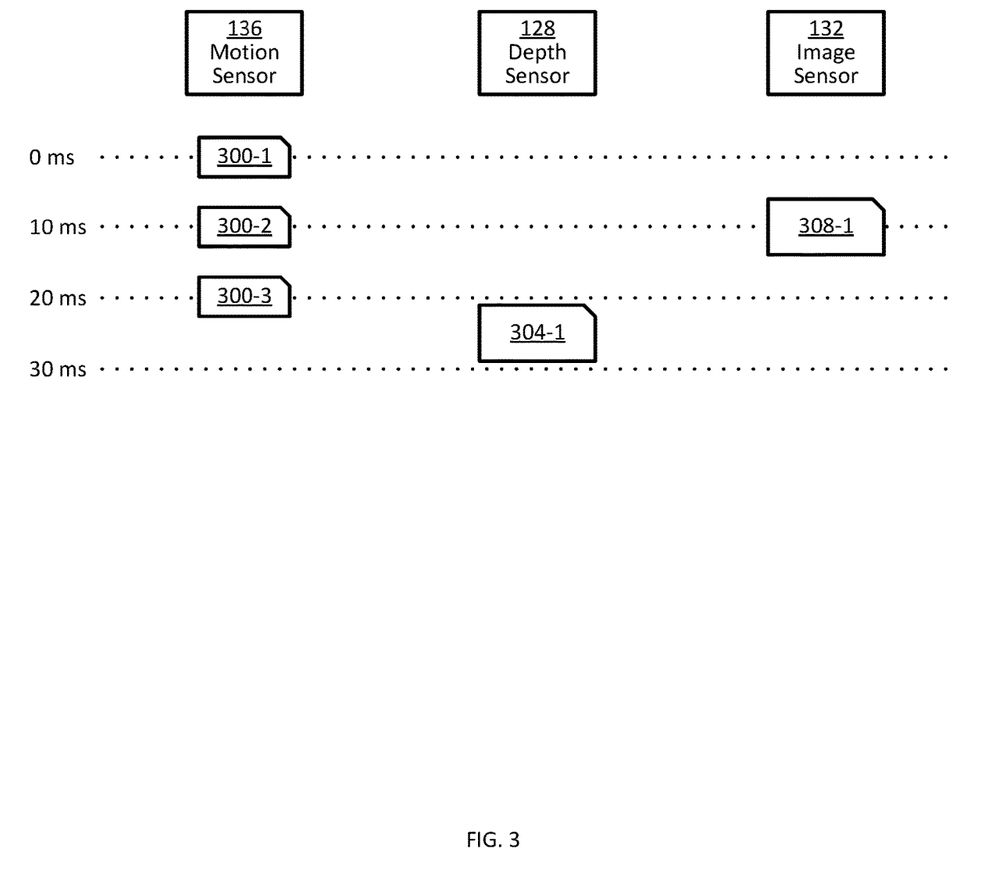
FIG. 3 is a diagram illustrating an example performance of blocks 205, 210 and 215 of the method of FIG. 2.

Turning to FIG. 3, an example timing diagram is shown illustrating performances of blocks 205 and 210. For example, the processor 112 may, at the time labelled 0 ms, send a command to the motion sensor 136, the depth sensor 128, and the image sensor 132, to begin data capture. The motion sensor 136 is configured to generate orientations 300-1, 300-2, 300-3, and so on (collectively referred to as orientations 300, and generically referred to as an orientation 300; similar nomenclature is also used for other components herein that are labelled with hyphenated suffixes). In the illustrated example, the motion sensor 136 generates orientations at a frequency of about 100 Hz (e.g., once every 10 ms).

The depth sensor 128 generates 3D images at a rate of about ten frames per second. However, for illustrative purposes the capture process may not initiate exactly at 0 ms (e.g., instead beginning at 5 ms), and the sensor 128 may take about 20 ms to generate a 3D image 304-1. The timestamp associated with the image 304-1 may, therefore, reflect a time that is about 25 ms later than the timestamp associated with the orientation 300-1, and about 5 ms later than the timestamp associated with the orientation 300-3.

The image sensor 132 generates 2D images at a rate of about twenty frames per second. In the example illustrated in FIG. 3, the sensor 132 may begin a capture operation substantially immediately (e.g., at 0 ms), and require about 10 ms to generate a 2D image 308-1. The timestamp associated with the image 308-1 may therefore be about equal to the timestamp associated with the orientation 300-2. As will be apparent, the specific sampling rates, frame rates, and timing discussed above is purely exemplary, and may vary widely based on the capabilities of the sensors 136, 128, and 132.

Figure 4:
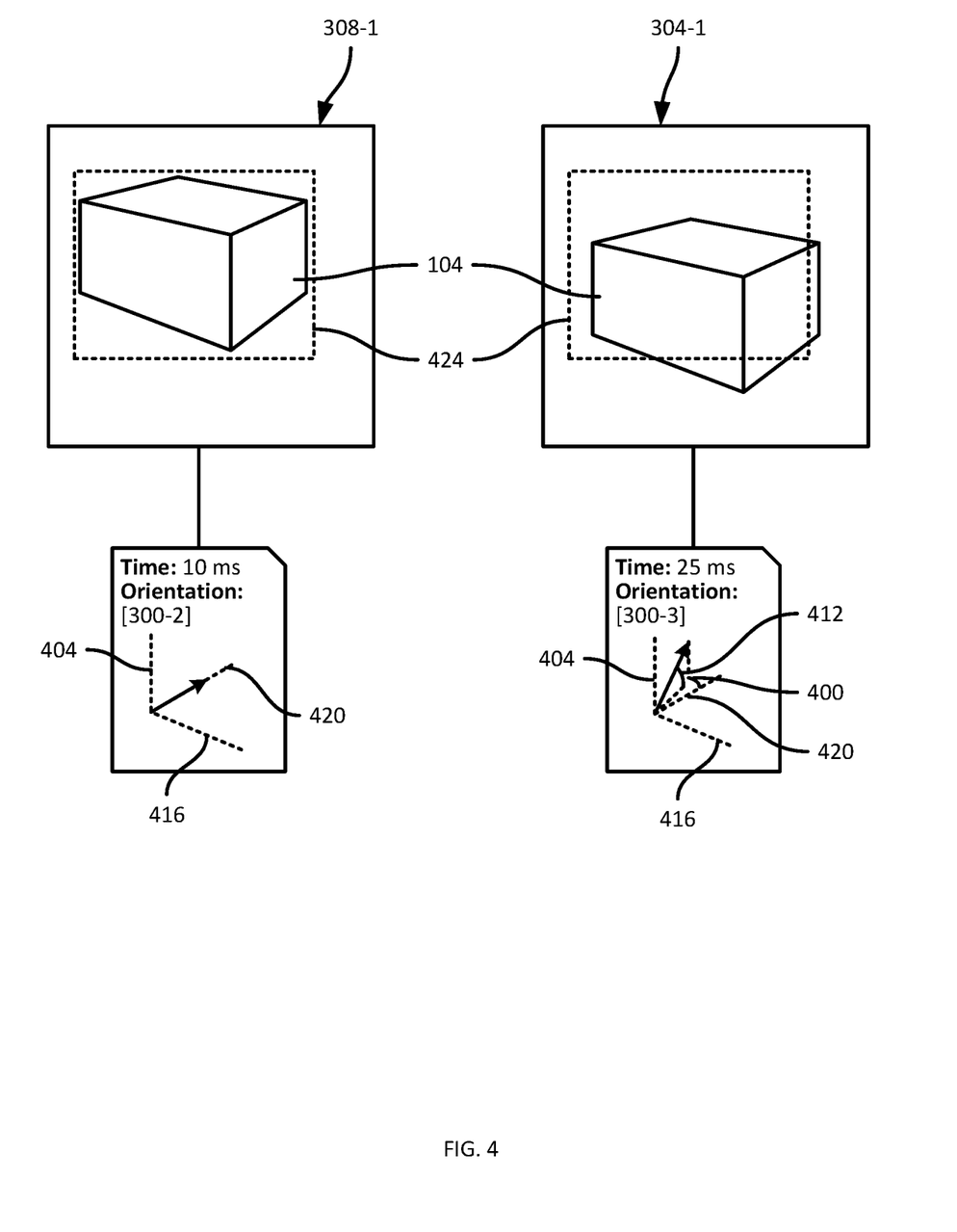
FIG. 4 is a diagram illustrating the images and motion data obtained in the example performance of blocks 205, 210, and 215 shown in FIG. 3.

FIG. 4 illustrates the images 304-1 and 308-1, along with the associated timestamps and orientations. It will be understood that timestamps in practice may be date and time strings, rather than the relative indications of a number of milliseconds shown in FIG. 4, which is used solely for simplicity of illustration. As seen in FIG. 4, the orientation 300-2 is associated with the image 308-1, and the orientation 300-3 is associated with the image 304-1. The orientations 300-2 and 300-3 indicate movement of the device 100, e.g., in the form of a roll 400 about an axis 404, and a pitch 412 about an axis 416 (and no yaw about an axis 420). As a result of the change in orientation of the device 100 between the capture of the image 308-1 and the capture of the image 304-1, a region of interest 424, such as a bounding box, encompassing the object 104 determined from the image 308-1 may not map correctly to the true position of the object 104 in the image 304-1.

Returning to FIG. 2, at block 220 the processor 112 can optionally determine a difference between the timestamps associated with the 2D image 308-1 and the 3D image 304-1. The processor 112 can be configured to determine whether the timestamps match, e.g., by comparing the difference (15 ms in this example) to a predetermined threshold. For example, the threshold applied at block 220 can be a static threshold maintained in the memory 116. In other examples, the threshold applied at block 220 can be the inter-frame time of the slowest image sensor, e.g., 100 ms in this example. When the determination at block 220 is affirmative, or if block 220 is omitted, the device 100 proceeds to block 225.

At block 225, the device 100 is configured to determine whether the orientations associated with the 2D image 308-1 and the 3D image 304-1 match. The determination at block 225 can include determining one or more differences in pitch, roll, and yaw angles. In other examples, the determination at block 225 can include determining a distance between positions represented in the motion data associated with the images 308-1 and 304-1. In other words, the processor 112 can determine one or both of a rotation and a translation of the device 100 based on the orientations 300-2 and 300-3. The processor 112 can then compare the determined rotation and/or translation to one or more thresholds. The determination at block 225 is affirmative if the difference between the orientations or poses of the device 100 associated with the images from block 210 exceeds the above thresholds.

For example, the threshold(s) can include an angular threshold, such that a rotation about any of the axes 404, 416, and 420 in excess of the angular threshold results in a negative determination at block 225. When pose tracking is used, the thresholds used at block 225 can also include a translational threshold, e.g., in the form of a distance. If the distance travelled by the device as defined by the motion data associated with the images exceeds the threshold distance, the determination at block 225 is negative.

When the determination at block 225 is affirmative, the images from block 210 are likely to be sufficiently synchronized for use in combined dimensioning algorithms as mentioned earlier, or any other suitable image processing operations relying on synchronized 2D and 3D images. The device 100 therefore proceeds to block 230, to deliver the images from block 210 to an image-processing module (e.g., the application 144).

When the determination at block 225 is negative, or when the determination at block 220 is negative (if block 220 is implemented), the device 100 proceeds to block 235. At block 235, the device 100 can suppress delivery of the images from block 210 to the image processing module 144. Suppression can be implemented, for example, by discarding the images 308-1 and 304-1 without passing the images 308-1 and 304-1 to the application 144. In some examples, the processor 112 can generate an inter-application notification from the application 140 to the application 144 indicating that a pair of frames was dropped. In other examples, the processor 112 can maintain one or both of the images 308-1 and 304-1 in working memory, e.g., for use in an electronic viewfinder function on the display 124, but omit delivery of the images to the application 144. Each image 308-1 and/or 304-1 can then be discarded upon receipt of the next image of the corresponding type.

Figure 5:
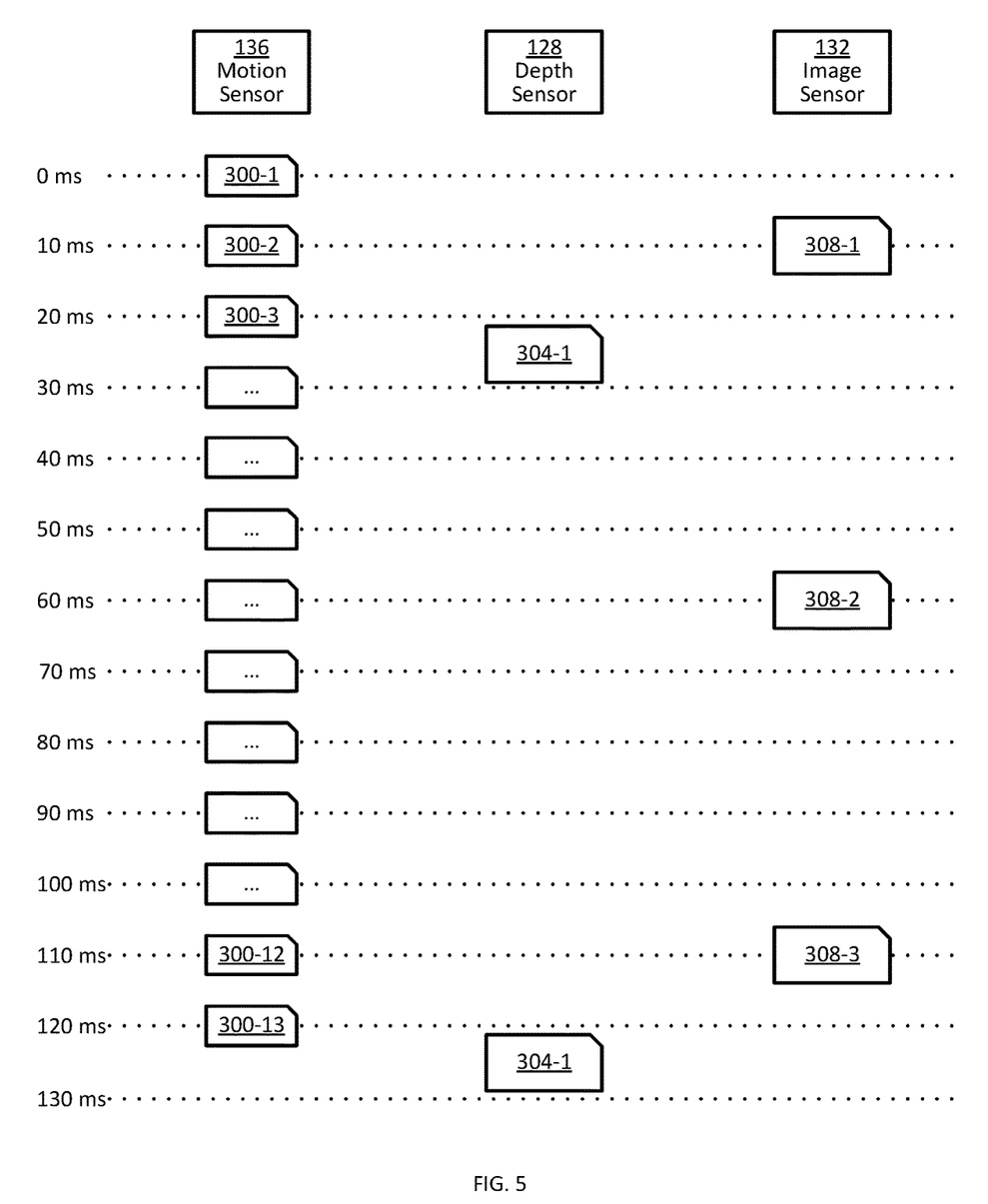
FIG. 5 is a diagram illustrating further example performances of blocks 205, 210, and 215 of the method of FIG. 2.

Following delivery of a pair of images at block 230, or suppression of delivery at block 235, the processor 112 can return to block 210, to process the next captured pair of images. The assessment of pairs of frames and resulting delivery or suppression can therefore continue, e.g., until the application 140 is terminated. FIG. 5 illustrates a continuation of the sequence illustrated in FIG. 3. For example, following suppression of delivery of the images 304-1 and 308-1, an image 308-2 from the sensor 132 may be discarded without assessment via the method 200 (e.g., because no depth image 304 is received to pair with the image 308-2, and an image 308-2 subsequently replaces the image 308-2 as the most recent). The images 308-3 and 304-1 can subsequently be assessed, e.g., after being associated with orientations 300-12 and 300-13, respectively.

In some examples, the processor 112 can determine whether to generate a notification prior to awaiting the next pair of images for processing. For example, at block 245, the processor 112 can determine whether a number of suppressed image pairs has exceeded a predetermined limit. For example, the processor 112 can track a count of consecutive performances of block 235. When block 230 is performed, the count can be cleared (e.g., reset to zero). When, at block 245, the processor 112 determines that the count has reached the predetermined limit, the determination at block 245 is affirmative. The processor 112 can then, at block 250, control the display 124 and/or other output to generate a notification, e.g., indicating to an operator of the device 100 (or another computing device, if the notification is delivered via the interface 120) that the sensors 128 and 132 are de-synchronized.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
capturing, via a first sensor, a three-dimensional image associated with a first orientation of a computing device;
capturing, via a second sensor, a two-dimensional image associated with a second orientation of the computing device;
determining a difference between the first orientation and the second orientation;
comparing the difference with a threshold; and
determining whether to deliver the three-dimensional image and the two-dimensional image to an image-processing module, based on the comparison of the difference with the threshold.

2. The method of claim 1, further comprising:
capturing, via a motion sensor of the computing device, a sequence of orientations; and
selecting the first orientation from the sequence for association with the three-dimensional image based on a capture time of the three-dimensional image.

3. The method of claim 1, wherein determining the difference between the first orientation and the second orientation includes determining at least one of a rotation or a translation of the computing device.

4. The method of claim 1, wherein determining whether to deliver the three-dimensional image and the two-dimensional image to the image-processing module includes:
(i) when the difference exceeds the threshold, suppressing delivery of the three-dimensional image and the two-dimensional image to the image-processing module, and
(ii) when the difference does not exceed the threshold, delivering the three-dimensional image and the two-dimensional image.

5. The method of claim 1, further comprising:
associating a first capture time with the three-dimensional image;
associating a second capture time with the two-dimensional image;
determining a time difference between the first capture time and the second capture time; and
comparing the time difference to a time threshold;
wherein determining whether to deliver the three-dimensional image and the two-dimensional image to the image-processing module is further based on the comparison of the time difference to the time threshold.

6. The method of claim 5, wherein determining whether to deliver the three-dimensional image and the two-dimensional image to the image-processing module includes:
suppressing delivery of the three-dimensional image and the two-dimensional image to the image-processing module when at least one of (i) the difference exceeds the threshold, or (ii) the time difference exceeds the time threshold.

7. The method of claim 1, further comprising:
in response to suppressing delivery of the three-dimensional image and the two-dimensional image to the image-processing module based on the comparison, generating a notification.

8. The method of claim 7, further comprising:
prior to generating the notification, determining that delivery of a predetermined number of three-dimensional images and two-dimensional images has been suppressed.

9. A computing device, comprising:
a first sensor;
a second sensor; and
a processor configured to:
capture, via the first sensor, a three-dimensional image associated with a first orientation;
capture, via the second sensor, a two-dimensional image associated with a second orientation;
determine a difference between the first orientation and the second orientation;
comparing the difference with a threshold; and
determine whether to deliver the three-dimensional image and the two-dimensional image to an image-processing module, based on the comparison of the difference with the threshold.

10. The computing device of claim 9, further comprising:
a motion sensor;
wherein the processor is configured to:
capture, via the motion sensor, a sequence of orientations; and
select the first orientation from the sequence for association with the three-dimensional image based on a capture time of the three-dimensional image.

11. The computing device of claim 9, wherein the processor is configured to determine the difference between the first orientation and the second orientation by determining at least one of a rotation or a translation of the computing device.

12. The computing device of claim 9, wherein the processor is configured to determine whether to deliver the three-dimensional image and the two-dimensional image to the image-processing module by:
   (i) when the difference exceeds the threshold, suppressing delivery of the three-dimensional image and the two-dimensional image to the image-processing module, and
   (ii) when the difference does not exceed the threshold, delivering the three-dimensional image and the two-dimensional image.

13. The computing device of claim 9, wherein the processor is configured to:
   associate a first capture time with the three-dimensional image;
   associate a second capture time with the two-dimensional image;
   determine a time difference between the first capture time and the second capture time;
   compare the time difference to a time threshold; and
   determine whether to deliver the three-dimensional image and the two-dimensional image to the image-processing module based on the comparison of the time difference to the time threshold.

14. The computing device of claim 13, wherein the processor is configured to determine whether to deliver the three-dimensional image and the two-dimensional image to the image-processing module by:
   suppressing delivery of the three-dimensional image and the two-dimensional image to the image-processing module when at least one of (i) the difference exceeds the threshold, or (ii) the time difference exceeds the time threshold.

15. The computing device of claim 9, wherein the processor is configured to:
   in response to suppressing delivery of the three-dimensional image and the two-dimensional image to the image-processing module based on the comparison, generate a notification.

16. The computing device of claim 15, wherein the processor is configured to:
   prior to generating the notification, determine that delivery of a predetermined number of three-dimensional images and two-dimensional images has been suppressed.

\* \* \* \* \*